(12) United States Patent
Horner et al.

(10) Patent No.: US 10,493,343 B2
(45) Date of Patent: Dec. 3, 2019

(54) APPARATUS FOR PLAYING A GAME AND METHOD

(71) Applicants: Russell James Horner, Brook Park, OH (US); Deborah Lee Horner, Brook Park, OH (US)

(72) Inventors: Russell James Horner, Brook Park, OH (US); Deborah Lee Horner, Brook Park, OH (US)

(*) Notice: Subject to any disclaimer, the term of this patent is extended or adjusted under 35 U.S.C. 154(b) by 0 days.

(21) Appl. No.: 16/425,504

(22) Filed: May 29, 2019

(65) Prior Publication Data
US 2019/0282874 A1 Sep. 19, 2019

Related U.S. Application Data

(63) Continuation of application No. 15/959,148, filed on Apr. 20, 2018, which is a continuation of application
(Continued)

(51) Int. Cl.
| | | |
|---|---|---|
| A63B 63/00 | (2006.01) | |
| A63B 67/06 | (2006.01) | |
| G09B 19/22 | (2006.01) | |
| A63B 39/00 | (2006.01) | |
| A63B 71/00 | (2006.01) | |
| A63B 47/00 | (2006.01) | |

(52) U.S. Cl.
CPC ........... *A63B 67/06* (2013.01); *A63B 39/00* (2013.01); *A63B 47/00* (2013.01); *A63B 71/0036* (2013.01); *G09B 19/22* (2013.01); *A63B 63/00* (2013.01); *A63B 2209/00* (2013.01)

(58) Field of Classification Search
CPC .... A63B 63/00; A63B 67/06; A63B 2024/005; A63F 9/02; A63F 9/0204; F41J 1/00; F41J 1/10; F41J 7/00; F41J 7/04
USPC ....................................... 273/398–402, 138.4
See application file for complete search history.

(56) References Cited

U.S. PATENT DOCUMENTS

| | | |
|---|---|---|
| 858,990 A | 7/1907 | Kemper |
| 970,881 A | 9/1910 | Cadwallader |
| (Continued) | | |

OTHER PUBLICATIONS https://www.bing.com/videos/search?q=epic+giant+basketball+connect+4&&view=detail&mid=294AD1BC2AD6031708F0294AD1BC2AD6031708F0&&FORM=VRDGAR Jul. 28, 2017.*

*Primary Examiner* — Mark S Graham
(74) *Attorney, Agent, or Firm* — Renner, Otto, Boisselle & Sklar, LLP

(57) ABSTRACT

An apparatus for playing a game includes a plurality of channels, each of the plurality of channels configured to hold and display a column of spherical game-pieces, each of the plurality of channels having an upper end and a lower end, each upper end configured to individually receive at least one of the spherical game-pieces, each lower end configured to support a respective column of spherical game-pieces by preventing passage of a bottom game-piece from a respective channel; a funnel affixed to the plurality of channels and configured to receive a thrown spherical game-piece and to direct the thrown spherical game-piece into the upper end of one of the plurality of channels; and a base stand operably connected to the plurality of channels and configured to rest upon a horizontal surface and to retain the plurality of channels at an acute angle relative to the horizontal surface.

20 Claims, 5 Drawing Sheets

Related U.S. Application Data

No. 15/883,105, filed on Jan. 30, 2018, now abandoned.

(60) Provisional application No. 62/568,269, filed on Oct. 4, 2017.

(56) References Cited

U.S. PATENT DOCUMENTS

| | | |
|---|---|---|
| 1,037,887 A | 9/1912 | Doerr |
| 1,371,867 A | 3/1921 | Dean |
| 1,531,455 A | 1/1924 | Russell |
| 3,656,750 A | 4/1972 | Neunier |
| 3,790,174 A | 2/1974 | Skillern |
| 3,797,828 A | 3/1974 | Ishikawa |
| 4,243,277 A | 1/1981 | Strongin |
| 4,245,842 A | 1/1981 | Kuna |
| 4,796,886 A | 1/1989 | Loh |
| 4,863,175 A | 9/1989 | Ricks, Jr. |
| 4,905,996 A | 3/1990 | Tallent |
| 5,632,490 A | 5/1997 | Brown |
| 2007/0045964 A1* | 3/2007 | Petras .................... A63B 63/00 273/317 |
| 2015/0217185 A1* | 8/2015 | Cranford .............. A63B 67/002 273/355 |

\* cited by examiner

APPARATUS FOR PLAYING A GAME AND METHOD

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of games of existing art and more specifically relates to backyard ball-toss games.

RELATED ART

Backyard games encompass a wide variety of gameplay. Games can be played by an entire family or just one person. Many social events include a game of some type. Presently there is a clear distinction between conventional backyard games and indoor games. Backyard games are set up outside, typically in the yard of a person's estate. Backyard games often involve throwing an object to a target; such games include horseshoes, ladder toss, lawn darts and bocce ball. Generally, backyard games cannot be played indoors due to space restrictions and potential property damage. Indoor games involve smaller pieces, such as puzzles, chess, and games that include figurines. Generally, indoor games cannot be played outdoors due to the sensitive nature of the pieces.

U.S. Pat. No. 4,905,996 to David P. Tallent relates to a ball and target net apparatus. The described ball and target net apparatus includes a target net that has a perimeter framework securing a generally planar net wherein the frame work includes a plurality of forwardly extending horizontal legs and associated bracing to maintain the netting in a secure arrangement in use. The framework and the legs of the apparatus are telescoping to affect a compact structure easily stored when not in use. An inner net is selectively securable to spaced elongate straps longitudinally secured relative to the main net portion of the apparatus to provide a target in variable orientation relative to the main net.

SUMMARY OF THE INVENTION

In view of the foregoing disadvantages inherent in the known backyard game art, the present disclosure provides a novel apparatus for playing a game. The general purpose of the present disclosure, which will be described subsequently in greater detail, is to provide an entertaining and efficient apparatus for playing a game.

An apparatus for playing a game is disclosed herein. The apparatus for playing a game includes a first plurality of spherical game-pieces of a first color, each sized and dimensioned to be thrown by hand. A second plurality of spherical game-pieces of a second color, each sized and dimensioned to be thrown by hand. A base stand is configured to rest upon a substantially horizontal surface. The base stand supports a plurality of vertically oriented channels each configured to hold and display a column of the spherical game-pieces. Each of the of vertically oriented channels has an upper end and a lower end, relative to the base stand. Each upper end of a vertically oriented channel is configured to individually receive at least one of the spherical game-pieces while each lower end is configured to prevent the passage of game-pieces through the lower end of the respective channel. A funnel is affixed to the base stand that is configured to receive a thrown game-piece, and to direct the thrown game-piece into the upper end of one of plurality of vertically oriented channels.

According to another embodiment, a method for playing a game is also disclosed herein. The method includes the step of providing an apparatus for playing a game; the apparatus for playing a game comprising a first plurality of spherical game-pieces of a first color, each sized and dimensioned to be thrown by hand, a second plurality of spherical game-pieces of a second color, each sized and dimensioned to be thrown by hand, and a base stand configured to rest upon a substantially horizontal surface. The base stand has a top and a bottom, relative to the substantially horizontal surface, a plurality of vertically oriented channels affixed to the base stand, each configured to hold and display a column of a portion of the first plurality of the spherical game-pieces, a portion of the second plurality of spherical game-pieces, or any combination thereof. Each of the plurality of vertically oriented channels has an upper end and a lower end, relative to the base stand, each upper end configured to individually receive at least one of the first plurality of the spherical game-pieces and the second plurality of spherical game-pieces, each lower end configured to support a respective column by preventing passage of a bottom game-piece from a respective channel, and a funnel affixed to the base stand. The funnel is configured to receive a thrown game-piece, and to direct the thrown game-piece into the upper end of one of plurality of vertically oriented channels.

The method also includes the step of throwing one of the first plurality of spherical game-pieces of a first color, and alternatively the second plurality of spherical game-pieces of a second color, into the funnel such that the one of the first plurality of spherical game-pieces of a first color, and alternatively the second plurality of spherical game-pieces of a second color, is directed into one of the plurality of vertically oriented channels, the first plurality of spherical game-pieces of a first color corresponding to a first player and alternatively a first team, and the second plurality of spherical game-pieces of a second color corresponding to a second player and alternatively a second tea. The method further includes the steps of repeating the process of throwing one of the first plurality of spherical game-pieces of a first color, and alternatively the second plurality of spherical game-pieces of a second color, into the funnel, alternating turns between the first player and alternatively the first team, and the second player and alternatively the second team, until a victor is determined, and determining the first player and alternatively the first team as the victor if the first plurality of spherical game-pieces of a first color comprise a row of four as arrayed in the plurality of vertically oriented channels, and alternatively determining the second player and alternatively the second team as the victor if the second plurality of spherical game-pieces of a second color comprise a row of four as arrayed in the plurality of vertically oriented channels; wherein the row of four comprises four adjacent spherical game-pieces of the same color in a vertical, horizontal, or diagonal orientation.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, an apparatus for playing a game, constructed and operative according to the teachings of the present disclosure.

The various embodiments of the present invention will hereinafter be described in conjunction with the appended drawings, wherein like designations denote like elements.

DETAILED DESCRIPTION

Figure 1:
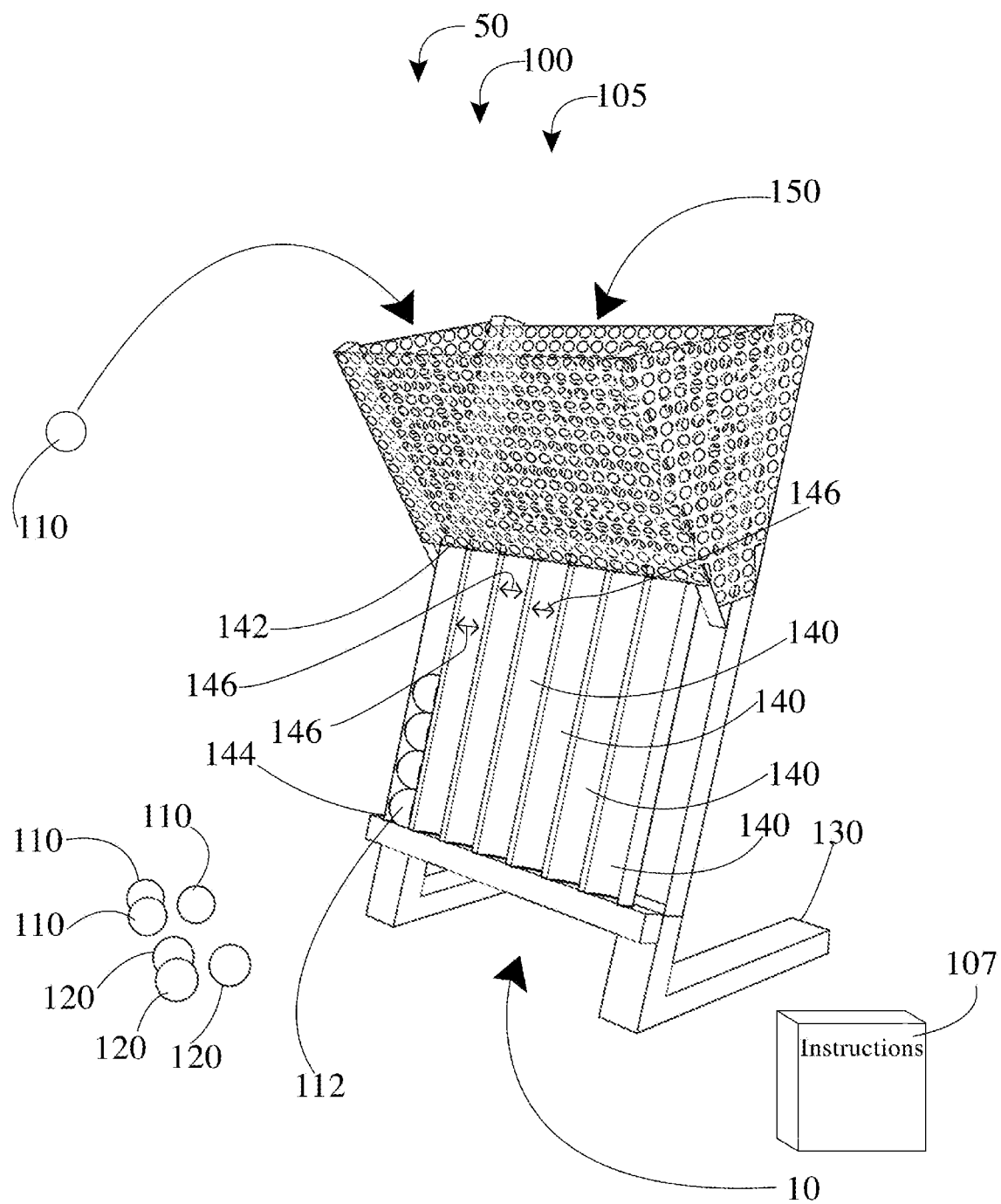
FIG. 1 is a front perspective view of the apparatus for playing a game during an 'in-use' condition, according to an embodiment of the disclosure.

As discussed above, embodiments of the present disclosure relate to a backyard ball-toss game and more particularly to an apparatus for playing a game as used to provide an apparatus for playing an entertaining game.

Generally, an apparatus for playing a game includes a first plurality of spherical game-pieces of a first color, and a second plurality of spherical game-pieces of a second color, each sized and dimensioned to be thrown by hand. The first plurality of spherical game-pieces of a first color and the second plurality of spherical game-pieces of a second color each may have a diameter of about three inches and alternatively the diameter of about one-and-a-quarter inches. The first plurality of spherical game-pieces of a first color and the second plurality of spherical game-pieces of a second color may be ping-pong balls, and alternatively tennis balls. A base stand, that may be constructed of wood, is configured to rest upon a substantially horizontal surface; the base stand having a top and a bottom, relative to the substantially horizontal surface. The base stand may comprise a self-supporting stand having a display side and a supporting side. The self-supporting stand is configured such that the display side and the supporting side are disposed at an acute angle relative to each other. A plurality of vertically oriented channels may be aligned substantially in a plane; the plane at an incline relative to the substantially horizontal surface; the plurality of vertically oriented channels being located on an upward facing side of the base stand with respect to the substantially horizontal surface and the plane. The plurality of vertically oriented channels may be affixed to the base stand, each configured to hold and display a column of a portion of the first plurality of the spherical game-pieces, a portion of the second plurality of spherical game-pieces, or any combination thereof. Each of the plurality of vertically oriented channels having an upper end and a lower end, relative to the base stand, each upper end may be configured to individually receive at least one of the first plurality of the spherical game-pieces and the second plurality of spherical game-pieces. Each lower end may be configured to support a respective column by preventing passage of a bottom game-piece from a respective channel.

Each lower end of the plurality of vertically oriented channels may have a closed position and an open position, and may be further configured to release its respective column by opening from the closed position to the open position, permitting passage through its respective column. The plurality of vertically oriented channels may further each include a viewing slot vertically disposed along the vertically oriented channel, and configured such that the contents of the vertically oriented channel are visible. The plurality of vertically oriented channels may comprise seven vertically oriented channels. A funnel is affixed to the base stand; the funnel is configured to receive a thrown game-piece, and to direct the thrown game-piece into the upper end of one of plurality of vertically oriented channels. The funnel may include a frame configured to define edges of the funnel, and a netting material extending between the edges of the frame configured to receive and direct the thrown game-piece into the upper end of one of plurality of vertically oriented channels.

The funnel may include a forward ramp, a rear ramp, and two sidewalls. The forward ramp and the rear ramp extend upward from the upper ends of plurality of vertically oriented channels and away from each other relative to the plane of the plurality of vertically oriented channels. The forward ramp, the rear ramp, and the two sidewalls together may be configured to circumscribe the upper ends of plurality of vertically oriented channels. The two sidewalls may extend between the forward ramp and the rear ramp, with one of the two sidewalls extending upward from the upper end of a first of the plurality of vertically oriented channels aligned in the plane, and the other of the two sidewalls extending upward from the upper end of a last of the plurality of vertically oriented channels aligned in the plane.

The apparatus for playing a game may further comprise a storage container configured to contain both the first plurality of spherical game-pieces and the second plurality of spherical game-pieces together. The storage container may be sized and dimensioned to contain at least twenty-four 3-inch diameter balls. The storage container may fit beneath the plurality of vertically orientated channels and may be configured to receive the first plurality of spherical game-pieces and the second plurality of spherical game-pieces when each lower end of the plurality of vertically oriented channels is opened from the closed position to the open position.

Referring now more specifically to the drawings by numerals of reference, there is shown in FIGS. 1-4, various views of an apparatus for playing a game 100.

FIG. 1 shows an apparatus for playing a game 100 during an 'in-use' condition 50, according to an embodiment of the present disclosure. Here, the apparatus for playing a game 100 may be beneficial for use by a user 40 to play a game involving at least one player. As illustrated, the apparatus for playing a game 100 may include a base stand 130 configured to be secured on a horizontal surface 10. The base stand 130 may be configured to retain and elevate a plurality of tubes 140 from the horizontal surface 10. Each of the plurality of tubes 140 may be configured to hold any combination of a first plurality of spherical game-pieces of a first color 110 and a second plurality of spherical game-pieces of a second color 120. The plurality of tubes 140 may each include viewing slots 146 traversing the length of each of the plurality of tubes 140. The viewing slots 146 may display any combination of a first plurality of spherical game-pieces of a first color 110 and a second plurality of spherical game-pieces of a second color that may have been retained in the plurality of tubes 140 as a column of balls 112.

Apparatus for playing a game 100 may further include a funnel 150 configured to direct any combination of a first plurality of spherical game-pieces of a first color 110 and a second plurality of spherical game-pieces of a second color 120 into the plurality of tubes 140. Each of the plurality of tubes 140 may include a tube-upper end 142 and a tube-lower end 144. The tube-upper end 142 may be configured to allow the passage of any combination of a first plurality of spherical game-pieces of a first color 110 and a second plurality of spherical game-pieces of a second color 120. The tube-lower end 144 may be configured to restrict the passage of any combination of a first plurality of spherical game-pieces of a first color 110 and a second plurality of spherical game-pieces of a second color 120 through the plurality of tubes 140. Those with ordinary skill in the art will now appreciate that upon reading this specification and by their understanding the art of games as described herein, methods of gameplay (and alternate gameplay) will be understood by those knowledgeable in such art.

According to one embodiment, the apparatus for playing a game 100 may be arranged as a kit 105. In particular, the apparatus for playing a game 100 may further include a set of instructions 107. The instructions 107 may detail functional relationships in relation to the structure of the apparatus for playing a game 100 such that the apparatus for playing a game 100 can be used, maintained, or the like, in a preferred manner.

Figure 2:
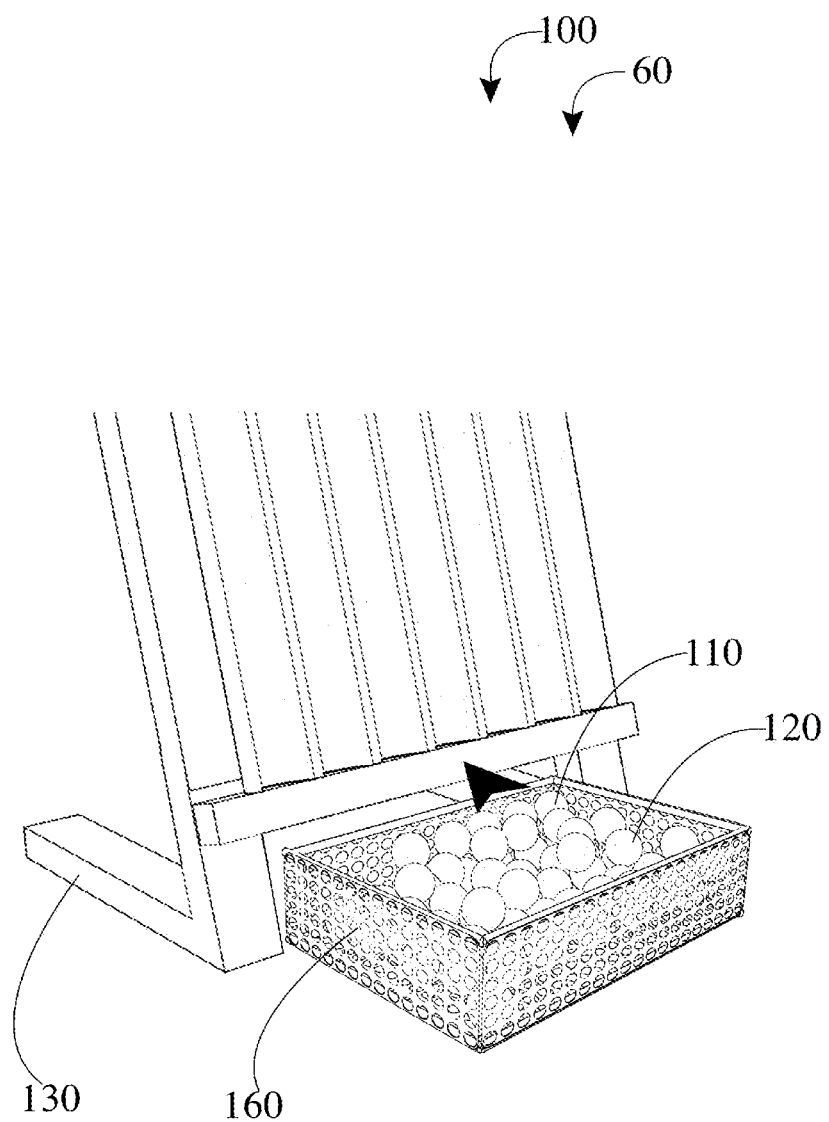
FIG. 2 is a partial front perspective view of the apparatus for playing a game of FIG. 1 during a 'non-use', according to an embodiment of the present disclosure.

Referring now to FIG. 2 showing the apparatus for playing a game 100 during a 'non-use' condition 60 of FIG. 1, according to an embodiment of the present disclosure. As above, the apparatus for playing a game 100 may include a storage container 160 configured to retain any combination of a first plurality of spherical game-pieces of a first color 110 and a second plurality of spherical game-pieces of a second color 120. The storage container 160 may be stowed beneath the plurality of tubes 140 (FIG. 1) that has been retained by the base stand 130.

Figure 3:
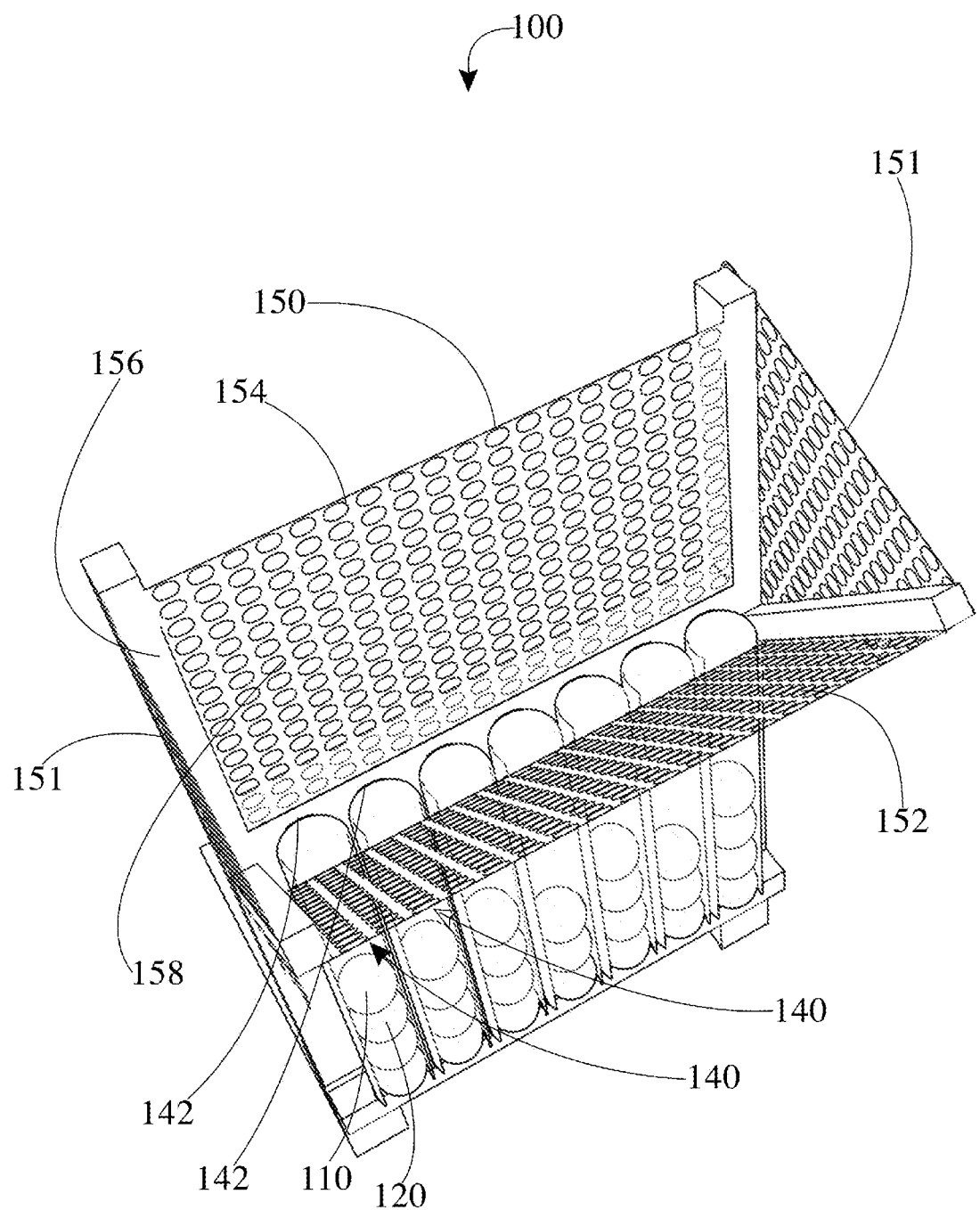
FIG. 3 is a top perspective view of the apparatus for playing a game of FIG. 1, according to an embodiment of the present disclosure.

FIG. 3 is a top perspective view of the apparatus for playing a game 100 of FIG. 1, according to an embodiment of the present disclosure. As described above the apparatus for playing a game 100 may include a funnel 150. The funnel 150 may comprise a frame 156 and a netting material 158. The frame 156 may tautly retain the netting material 158. The netting material 158 may create a tapered barrier in the form of a first ramp 152 and a second ramp 154.

As illustrated in FIG. 3, the first ramp 152 and the second ramp 154 may be used to guide any combination of a first plurality of spherical game-pieces of a first color 110 (FIG. 1) and a second plurality of spherical game-pieces of a second color 120 (FIG. 1) towards the tube-upper end 142 (FIG. 1) of each of the plurality of tubes 140 (FIG. 1).

Figure 4:
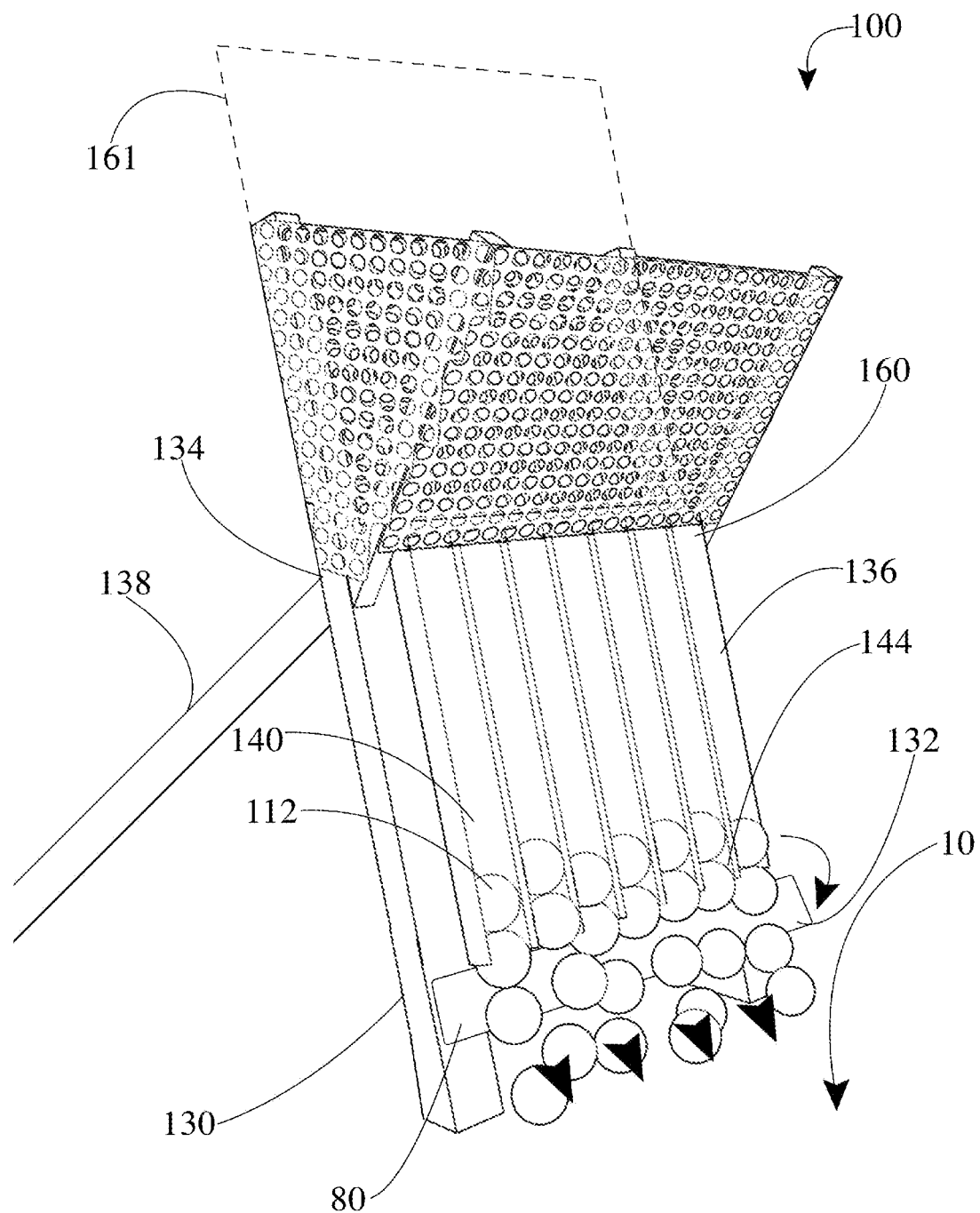
FIG. 4 is a front perspective view of the apparatus for playing a game of FIG. 1, according to an embodiment of the present disclosure.

Referring now to FIG. 4, a front perspective view of the apparatus for playing a game 100 of FIG. 1, according to an embodiment of the present disclosure. As illustrated, the base stand 130 that may be supported by a horizontal surface 10 may comprise an easel 134 type structure having a display side of stand 136 pivotably connected to a supporting side of stand 138. The base stand 130 may retain the plurality of tubes 140 in a vertically oriented plane 160. The vertical orientation of the plurality of tubes 140 is conceptually such that the column of balls 112 may be resting on a trapdoor 132. As shown, the trapdoor 132 may be configured to release the column of balls 112 from each of the plurality of tubes 140 when the trapdoor 132 is in an open state 80.

Figure 5:
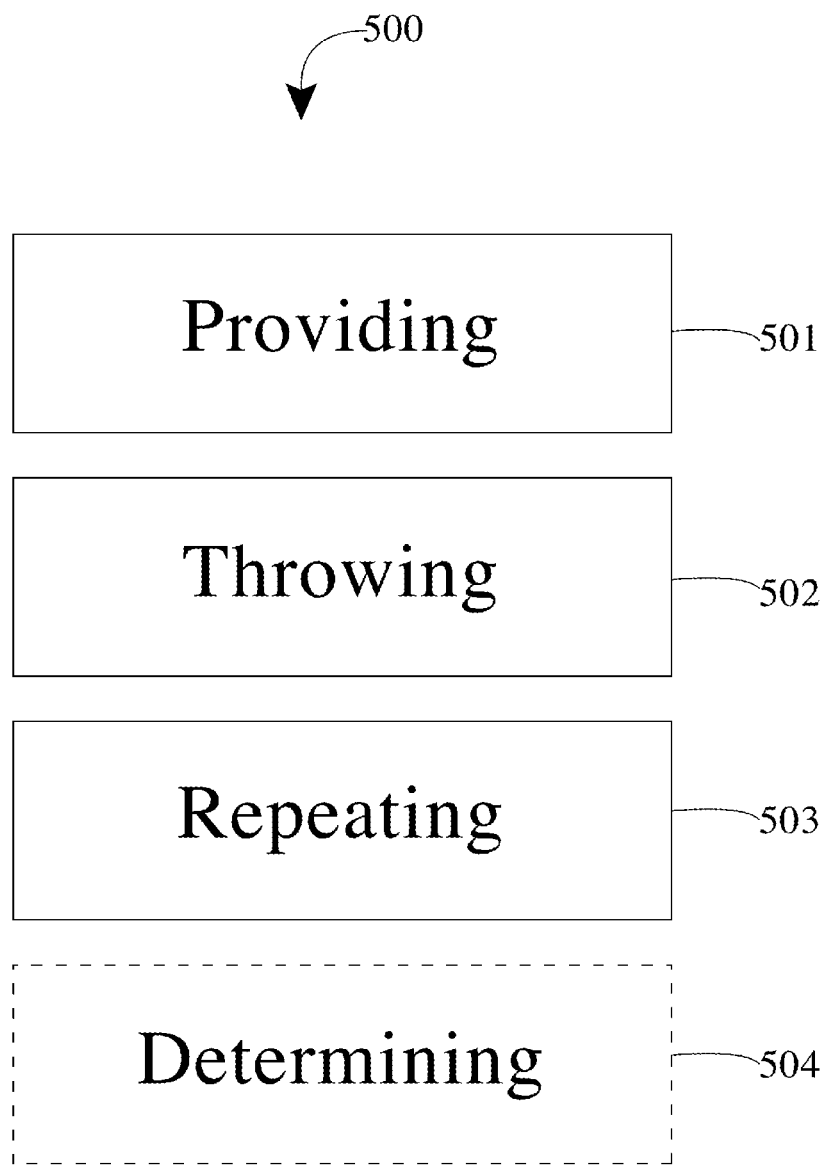
FIG. 5 is a flow diagram illustrating a method of playing a game, according to an embodiment of the present disclosure.

FIG. 5 is a flow diagram illustrating a method for playing a game 500, according to an embodiment of the present disclosure. In particular, the method for playing a game 500 may include one or more components or features of the apparatus for playing a game 100 as described above. As illustrated, the method for playing a game 500 may include the steps of: step one 501, providing an apparatus as described herein; step two 502, throwing one of the first plurality of spherical game-pieces of a first color, and alternatively the second plurality of spherical game-pieces of a second color, into the funnel such that the one of the first plurality of spherical game-pieces of a first color, and alternatively the second plurality of spherical game-pieces of a second color, is directed into one of the plurality of vertically oriented channels, the first plurality of spherical game-pieces of a first color corresponding to a first player and alternatively a first team, and the second plurality of spherical game-pieces of a second color corresponding to a second player and alternatively a second team; step three 503, repeating the process of throwing one of the first plurality of spherical game-pieces of a first color, and alternatively the second plurality of spherical game-pieces of a second color, into the funnel, alternating turns between the first player and alternatively the first team, and the second player and alternatively the second team, until a victor is determined; step four 504, determining the first player and alternatively the first team as the victor if the first plurality of spherical game-pieces of a first color comprise a row of four as arrayed in the plurality of vertically oriented channels, and alternatively determining the second player and alternatively the second team as the victor if the second plurality of spherical game-pieces of a second color comprise a row of four as arrayed in the plurality of vertically oriented channels, wherein the row of four comprises four adjacent spherical game-pieces of the same color in a vertical, horizontal, or diagonal orientation.

It should be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for playing a game 500, are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

The invention claimed is:

1. An apparatus for playing a game, the apparatus comprising:
   a plurality of channels disposed adjacent each other along a width axis of the apparatus, each of the plurality of channels extending along a longitudinal axis perpendicular to the width axis and configured to hold and display a column of spherical game-pieces, each of the plurality of channels having an upper end and a lower end, each upper end configured to individually receive at least one of the spherical game-pieces, each lower end configured to support a respective column of spherical game-pieces by preventing passage of a bottom game-piece from a respective channel along the width axis, the longitudinal axis, and a depth axis perpendicular to the width axis and at an acute angle relative to the longitudinal axis;
   a funnel affixed to the plurality of channels and configured to receive a thrown spherical game-piece and to direct the thrown spherical game-piece into the upper end of one of the plurality of channels; and
   a base stand operably connected to the plurality of channels and configured to rest upon a horizontal surface and to retain the plurality of channels at the acute angle relative to the horizontal surface.

2. The apparatus of claim 1, comprising:
   a first plurality of spherical game-pieces of a first color, each sized and dimensioned to be thrown by hand; and
   a second plurality of spherical game-pieces of a second color, each sized and dimensioned to be thrown by hand.

3. The apparatus of claim 2, further comprising a storage container configured to contain both the first plurality of spherical game-pieces and the second plurality of spherical game-pieces together.

4. The apparatus of claim 3, wherein the storage container is sized and dimensioned to contain at least twenty-four 3-inch diameter balls.

5. The apparatus of claim 1, wherein the plurality of channels is aligned substantially in a plane; and
   wherein the funnel includes a forward ramp, a rear ramp, and two sidewalls, the forward ramp and the rear ramp extending upward from the upper ends of plurality of channels and away from each other relative to the plane of the plurality of channels, the two sidewalls extending between the forward ramp and the rear ramp, with one of the two sidewalls extending upward from the upper end of a first of the plurality of channels aligned in the plane, and the other of the two sidewalls extending upward from the upper end of a last of the plurality of channels aligned in the plane, the forward ramp, the rear ramp, and the two sidewalls together configured to circumscribe the upper ends of plurality of channels, the rear ramp extending along the longitudinal axis at the acute angle relative to the horizontal surface.

6. The apparatus of claim 1, wherein the funnel includes a frame configured to define edges of the funnel, and a netting material extending between the edges of the frame configured to receive and direct the thrown game-piece into the upper end of one of plurality of channels.

7. The apparatus of claim 1, wherein the spherical game-pieces each has a diameter of three inches.

8. The apparatus of claim 1, wherein the spherical game-pieces are ping-pong balls.

9. The apparatus of claim 1, wherein the spherical game-pieces each has a diameter of one-and-a-quarter inches.

10. The apparatus of claim 1, wherein the plurality of channels includes seven channels.

11. The apparatus of claim 1, wherein each of the plurality of channels includes a viewing slot disposed along the channel and configured such that the contents of the channel are visible.

12. The apparatus of claim 1, wherein the stand comprises the plurality of channels and the stand form an easel-type structure, the plurality of channels forming a display portion of the easel and the stand forming a supporting portion of the easel.

13. The apparatus of claim 1, wherein the plurality of channels is aligned in a plane, said plane at an incline relative to the horizontal surface, the plurality of channels each having a longitudinal opening located on an upward facing side with respect to the horizontal surface.

14. The apparatus of claim 1, wherein the stand is made of wood.

15. The apparatus of claim 1, wherein each lower end of the plurality of channels has a closed mode and an open mode and is further configured to release its respective column by transitioning from the closed mode to the open mode, permitting passage of its respective column.

16. The apparatus of claim 15, further comprising a storage container configured to contain the plurality of spherical game-pieces, the storage container sized and dimensioned to fit beneath the plurality of channels and receive the plurality of spherical game-pieces when each lower end of the plurality of channels transitions from the closed mode to the open mode.

17. An apparatus for playing a game, the apparatus comprising:
    a plurality of channels disposed adjacent each other along a width axis of the apparatus, each of the plurality of channels extending along a longitudinal axis perpendicular to the width axis and configured to hold and display a column of spherical game-pieces, each of the plurality of channels having an upper end and a lower end, each upper end configured to individually receive at least one of the spherical game-pieces, each lower end configured to support a respective column of spherical game-pieces by preventing passage of a bottom game-piece from a respective channel along the width axis, the longitudinal axis, and a depth axis perpendicular to the width axis and the longitudinal axis;
    a funnel affixed to the plurality of channels and configured to receive a thrown spherical game-piece and to direct the thrown spherical game-piece into the upper end of one of the plurality of channels; and
    a base stand operably connected to the plurality of channels and configured to rest upon a horizontal surface and to retain the plurality of channels diagonal to the horizontal surface.

18. The apparatus of claim 17, wherein the funnel includes a frame configured to define edges of the funnel, and a netting material extending between the edges of the frame configured to receive and direct the thrown game-piece into the upper end of one of plurality of channels.

19. An apparatus for playing a game, the apparatus comprising:
    a plurality of channels disposed adjacent each other along a width axis of the apparatus, each of the plurality of channels extending along a longitudinal axis perpendicular to the width axis and configured to hold and display a column of spherical game-pieces, each of the plurality of channels having an upper end and a lower end, each upper end configured to individually receive at least one of the spherical game-pieces, each lower end configured to support a respective column of spherical game-pieces by preventing passage of a bottom game-piece from a respective channel along the width axis, the longitudinal axis, and a depth axis perpendicular to the width axis and the longitudinal axis, wherein the plurality of channels is aligned in a plane;

a funnel affixed to the plurality of channels and configured to receive a thrown spherical game-piece and to direct the thrown spherical game-piece into the upper end of one of the plurality of channels; and a base stand operably connected to the plurality of channels or the funnel and configured to rest upon a horizontal surface and to support the plurality channels with the plane at an incline relative to the horizontal surface.

20. The apparatus of claim 19, the plurality of channels each having a longitudinal opening located on an upward facing side with respect to the horizontal surface, the funnel includes a frame configured to define edges of the funnel, and a netting material extending between the edges of the frame configured to receive and direct the thrown game-piece into the upper end of one of plurality of channels.

* * * * *